United States Patent
Whitmore et al.

(10) Patent No.: US 10,633,746 B2
(45) Date of Patent: *Apr. 28, 2020

(54) CATHODIC CORROSION PROTECTION WITH CURRENT LIMITER

(71) Applicant: Vector Remediation Ltd., Winnipeg (CA)

(72) Inventors: David William Whitmore, Winnipeg (CA); Geoffrey Richard Child, Winnipeg (CA)

(73) Assignee: Vector Remediation Ltd., Winnipeg, MB (CA)

( * ) Notice: Subject to any disclaimer, the term of this patent is extended or adjusted under 35 U.S.C. 154(b) by 114 days.

This patent is subject to a terminal disclaimer.

(21) Appl. No.: 15/644,064

(22) Filed: Jul. 7, 2017

(65) Prior Publication Data

US 2019/0010614 A1    Jan. 10, 2019

(51) Int. Cl.
| | |
|---|---|
| *C23F 13/04* | (2006.01) |
| *C23F 13/18* | (2006.01) |
| *C23F 13/20* | (2006.01) |
| *C23F 13/12* | (2006.01) |

(52) U.S. Cl.
CPC .............. *C23F 13/18* (2013.01); *C23F 13/04* (2013.01); *C23F 13/12* (2013.01); *C23F 13/20* (2013.01)

(58) Field of Classification Search
CPC .......... C23F 13/02; C23F 13/04; C23F 13/06; C23F 13/08; C23F 13/20; C23F 13/22; C23F 2201/02; C23F 2213/10; C04B 2111/265

See application file for complete search history.

(56) References Cited

U.S. PATENT DOCUMENTS

| | | | | |
|---|---|---|---|---|
| 4,381,981 A | * | 5/1983 | Maes ..................... | G01R 17/06 204/196.04 |
| 4,713,158 A | * | 12/1987 | Lambert ................ | G01R 17/02 204/196.03 |
| 6,506,295 B1 | * | 1/2003 | Takahashi .............. | C23F 13/04 204/196.02 |

(Continued)

FOREIGN PATENT DOCUMENTS

CA        2961848       5/2017

OTHER PUBLICATIONS

Holt ("A Deeper Look Into Difference Amplifiers", Analog Dialogue, 48-08, pp. 1-3, 2014) (Year: 2014).*

*Primary Examiner* — Alexander W Keeling
(74) *Attorney, Agent, or Firm* — Adrian D. Battison; Ade & Company Inc.; Kyle R. Satterthwaite

(57) ABSTRACT

In a method for cathodically protecting and/or passivating a metal section in an ionically conductive material such as steel reinforcement in concrete or mortar, an impressed current or sacrificial anode communicates ionic current to the metal section and a storage component of electrical energy which can be a cell, battery or capacitor is provided as a component of the anode. The storage component can have replacement energy introduced by re-charging or replacing the component from an outside supply. Typically the cell or storage capacitor has an outer case which carries an anode material as an integral outer component. A mechanical clamp is provided to attach the assembly to a rebar. A current limiter is provided which prevents excess current draining the supply.

27 Claims, 6 Drawing Sheets

(56) References Cited

U.S. PATENT DOCUMENTS

| | | | |
|---|---|---|---|
| 6,822,462 B1 * | 11/2004 | Staerzl | C23F 13/04 205/727 |
| 9,790,601 B2 | 10/2017 | Lambourne | |
| 2003/0074162 A1 * | 4/2003 | Fourie | G01R 31/12 702/188 |
| 2004/0238347 A1 * | 12/2004 | Bennett | C23F 13/02 204/196.01 |
| 2012/0152732 A1 * | 6/2012 | Tarrant | C23F 13/10 204/196.3 |
| 2012/0261270 A1 * | 10/2012 | Glass | C23F 13/06 205/734 |
| 2014/0021062 A1 * | 1/2014 | Sergi | C23F 13/14 205/730 |
| 2015/0060298 A1 * | 3/2015 | Tourneur | C04B 41/009 205/734 |
| 2015/0284860 A1 * | 10/2015 | Glass | C23F 13/04 205/731 |
| 2016/0153096 A1 * | 6/2016 | Whitmore | C23F 13/18 205/731 |
| 2017/0183784 A1 * | 6/2017 | Morris | C23F 13/14 |

* cited by examiner

CATHODIC CORROSION PROTECTION WITH CURRENT LIMITER

This invention relates to a method and/or an anode assembly for cathodically protecting and/or passivating a metal section in an ionically conductive material using a cell or battery of cells to provide a voltage and particularly to an arrangement which limits a current supply by the anode assembly.

BACKGROUND OF THE INVENTION

Impressed current systems using a battery are known. Such impressed current systems can use other types of power supply including common rectifiers which rectify an AC voltage from a suitable source into a required DC voltage for the impressed current between the anode and the steel. It is also known to provide solar panels to be used in a system of this type.

In all cases such impressed current systems require regular maintenance and checking of the status of the power supply to ensure that the power supply does not fail leading to unexpected and unacceptable corrosion or overprotection of the steel within the structure to be protected. While such maintenance can be carried out and the power supply thus ensured, this is a relatively expensive process.

Alternatively galvanic systems can be used which avoid necessity for any power supply since the voltage between the steel and the anode is provided by selecting a suitable material for the anode which is sufficiently electro-negative to ensure that a current is generated to provide corrosion protection. These systems have obtained considerable success and are widely used.

There are two primary limitations of ordinary galvanic anodes as used in steel reinforced concrete. The first relates to the mass of zinc per anode which, depending on the required current output, limits the useful life of the anode. The second is the actual current output of the anode which may or may not be sufficient to halt corrosion of the steel. The current output is limited by the driving voltage, which is essentially a fixed property and varies with exposure conditions, age of the anode, and build-up of corrosion products over time.

Reference is also made to U.S. Pat. No. 8,961,746 (Sergi) issued Feb. 24, 2015, U.S. Pat. No. 8,968,549 Mar. 3, 2015 (Sergi) and U.S. Pat. No. 7,264,708 (Whitmore) issued Sep. 4, 2007 all issued to the present assignees the disclosures of which are incorporated herein by reference or may be referenced for more relevant information.

SUMMARY OF THE INVENTION

According to one aspect of the invention there is provided an anode assembly for use in cathodically protecting and/or passivating a metal reinforcing bar in an ionically conductive material, comprising:

an anode body for mounting at least partly within the ionically conductive material;

the anode body comprising an anode for communication of an ionic current through the ionically conductive material to the metal reinforcing bar;

the anode body being constructed and arranged so that when the anode is ionically connected to the ionically conductive material a voltage difference is generated between the anode and the metal reinforcing bar so as to cause a current to flow through the ionically conductive material between the anode and the metal reinforcing bar so as to provide cathodic protection of the metal reinforcing bar;

and a mounting assembly for fixedly mounting the anode body on the metal reinforcing bar so as to be supported by the bar at least partly within the ionically conductive material such that the electrical current can flow from the anode to the metal reinforcing bar;

the mounting assembly comprising:
an elongate rod member extending forwardly from the anode body to a forward end of the elongate rod member arranged for engagement with a first adjacent face of the metal reinforcing bar;
a hook member for engaging a second opposed face of the metal reinforcing bar;
and a coupling for drawing together the forward end of the rod member and the hook member for clamping the metal reinforcing bar therebetween.

According to another aspect of the invention there is provided an anode assembly for use in cathodically protecting and/or passivating a metal reinforcing bar in an ionically conductive material, comprising:

an anode body for mounting at least partly within the ionically conductive material;

the anode body comprising an anode for communication of an ionic current through the ionically conductive material to the metal reinforcing bar;

the anode body being constructed and arranged so that when the anode is ionically connected to the ionically conductive material a voltage difference is generated between the anode and the metal reinforcing bar so as to cause a current to flow through the ionically conductive material between the anode and the metal reinforcing bar so as to provide cathodic protection of the metal reinforcing bar;

and a mounting assembly for fixedly mounting the anode body on the metal reinforcing bar so as to be supported in ionic contact with the ionically conductive material such that the ionic current can flow from the anode to the metal reinforcing bar;

the mounting assembly comprising:
a first abutment member extending forwardly from the anode body to a forward end of the first abutment member arranged for engagement with a first adjacent face of the metal reinforcing bar;
a second abutment member for engaging a second opposed face of the metal reinforcing bar;
the first abutment member having at least a portion thereof with a male screw thread and the second abutment member having a female threaded coupling engaging the male screw thread for drawing the second abutment member toward the anode body for clamping the metal reinforcing bar therebetween.

According to another aspect of the invention there is provided an anode assembly for use in cathodically protecting and/or passivating a metal reinforcing bar in an ionically conductive material, comprising:

an anode body for mounting at least partly within the ionically conductive material, the anode body comprising:
an anode for communication of an ionic current to the metal reinforcing bar in the ionically conductive material;
a storage component of electrical energy with first and second poles for communicating electrical current generated by release of the electrical energy;
the first pole having an electrical connection to the anode;

and a mounting assembly for fixedly mounting the anode body on the metal reinforcing bar so as to be supported by the bar in ionic contact with the ionically conductive material such that the electrical current can flow from the storage component through the anode to the metal reinforcing bar;

the mounting assembly being connected to the second pole for electrical connection of the second pole to the metal reinforcing bar;

the mounting assembly comprising:

a first abutment member connected to the anode body for engaging one face of the metal reinforcing bar;

a second abutment member for engaging a second opposed face of the metal reinforcing bar;

and a coupling for drawing together the first and second abutment members for clamping the metal reinforcing bar therebetween.

The present arrangement is particularly concerned with mounting the anode body on a conventional steel reinforcing bar mounted in a setting material such as concrete or other cementitious material such as mortar. However the arrangement can be in some cases used in other locations.

In accordance with one important feature of the invention which can be used with any of the arrangements herein, the hook member comprises two parallel hook portions spaced longitudinally along the bar and connected together for common engagement with the bar. This acts to engage the bar at three positions spaced longitudinally of the bar with the first abutment or rod on one face in the middle and the two hook portions on either side on the opposite face. That is the hook member preferably includes two surface portions each located to engage the bar on a respective side of a position diametrically opposite the first face.

In accordance with one important feature of the invention which can be used with any of the arrangements herein, the anode body is attached to the elongate rod or first abutment member so that rotation of the anode body drives rotation of the forward end of the elongate rod member relative to the first face of the bar.

In this arrangement preferably the forward end of the elongate rod member includes one or more projections for biting into the bar. This can be provided by an outer circular edge of the end of the rod or by one or more projections on the faces itself.

In accordance with one important feature of the invention which can be used with any of the arrangements herein, the elongate rod member is threaded at least partly along it length so as to act as a screw to drive a female threaded portion of the second abutment member in a direction toward the anode body.

In accordance with one important feature of the invention which can be used with any of the arrangements herein, the hook member includes a female threaded portion for engaging the elongate rod member to draw together the forward end of the rod member or first abutment and the hook member or second abutment for clamping the metal reinforcing bar therebetween.

Preferably the female threaded portion is fixed to the hook member so that rotation of the rod member causes the hook member to move toward the anode body. However other arrangements can be used where the female portion comprises a nut which rotates on the screw relative to the second abutment so as to drive the second abutment toward the anode body.

In accordance with one important feature of the invention which can be used with any of the arrangements herein, the hook member or second abutment engages the elongate rod member at a position spaced from the anode body to prevent contact between the surface of the anode body and the metal bar. This is particularly important where the anode is powered by a cell or the power supply forming part of the anode body so as to prevent shorting of the power supply to the metal bar.

In accordance with one important feature of the invention which can be used with any of the arrangements herein, the elongate rod member is rigidly coupled to the anode body to fixedly hold the anode body at a predetermined distance and orientation relative to the bar. In this way the anode body can be located on the bar before pouring of the concrete or other material. Thus the anode body is held at a required position relative to the bar and to other adjacent bars to better locate an array of anodes relative to the bars. Alternatively the hook member may be rigidly coupled to the anode body and a threaded elongate member may be used to hold the anode body at a predetermined distance and orientation relative to the bar.

The arrangements disclosed herein can be used with an anode body which includes an anode of a material which is less noble than the metal bar so that it is sacrificial.

Alternatively in other embodiments the voltage difference is generated by a storage component of electrical energy with two poles for communicating electrical current generated by release of the electrical energy and by electrically connecting one pole to the metal bar and by electrically connecting the other pole to an anode on the anode body.

According to one aspect of the invention there is provided a method for catholically protecting and/or passivating a metal section in an ionically conductive material, comprising:

providing an anode for communication of an electrical current to the metal section in the ionically conductive material;

generating a voltage difference between the anode and the metal section so as to cause a current to flow through the ionically conductive material between the anode and the metal section so as to provide cathodic protection of the metal section;

and providing electrical components which limit the current to a maximum value.

The arrangements above this provide a mechanical clamp for the anode body onto the reinforcing bar. This arrangement can provide the following advantages:

The contacts act to bite into reinforcing steel;

The contacts make good connection even if surface of the bar is not clean such as contaminated with rust or concrete residue.

The clamp is adjustable to different bar sizes/diameters and sizes/roughness caused by corrosion.

The clamp creates a rigid attachment.

The clamp supports the anode body at a spaced position from connection point.

The mounting arrangement promotes more uniform current distribution since the anode is held at a position not very close to one bar and therefore passes most current more uniformly because of reduced differences in resistance.

The clamp does not easily rotate around steel bar like a wire wrap connection.

The clamped connection does not loosen as a result of any rotation of the anode body relative to the bar.

Anode body does not rotate/fall to down position due to gravity

The mechanical clamp allows the installer to position the anode on a selected bar within the section of concrete/mortar to be cast.

The connector allows anodes to be manufactured with a standard threaded rod as the first abutment.

In an arrangement using a power supply, the connection acts to firmly connect one pole of the supply to the reinforcing steel and ensure the other pole is spaced and will not contact the steel as this would cause a short circuit, drain the battery and provide no corrosion protection to the steel.

Different connectors can be provided for different size ranges.

Teeth or knife/sharp edges can be provided on an inside opening of a cavity defined by the hook member to bite into the reinforcing bar.

A concave end and additional teeth on the end of the threaded rod can act to cut into reinforcing bar.

These features ensure secure rigid, physical and electrical connection.

According to another aspect of the invention there is provided a method for cathodically protecting and/or passivating a metal section in an ionically conductive material, comprising:

providing an anode for communication of an electrical current to the metal section in the ionically conductive material;

generating a voltage difference between the anode and the metal section so as to cause a current to flow through the ionically conductive material between the anode and the metal section so as to provide cathodic protection of the metal section;

and providing electrical components which limit the current to a maximum value.

According to another aspect of the invention there is provided an anode assembly for use in cathodically protecting and/or passivating a metal section in an ionically conductive material, comprising:

an anode for communication of an ionic current to the metal section in the ionically conductive material;

a storage component of electrical energy with first and second poles for communicating electrical current generated by release of the electrical energy;

a connector for electrically connecting the first pole to the metal section;

the second pole being connected to the anode;

the anode being arranged to be mounted in ionic contact with the ionically conductive material such that the ionic current can flow from the storage component through the anode to the metal section;

and an electrical component which limits the current to a maximum value.

In this arrangement preferably subject to the maximum voltage available from the storage component the current is allowed to vary by the electrical components from the maximum to a lower value dependent on conductivity through the ionically conductive material so that the components act as a limiter but not a regulator. In this way the power draw by the limiter can be kept very low. The current is not sustained at a higher value than the natural value which will occur due to the voltage of the electrical component and the resistivity of the system.

In this way the electrical components act to extend the life of a battery, or other power supply system, or galvanic anode system as these have limited capacity and do not function after limited capacity is consumed.

Preferably the electrical components comprise a transistor where a current through the transistor is limited to the maximum. The transistor can be a conventional transistor or a FET. In this arrangement preferably the electrical components use a voltage difference between the first and second poles or between the anode and the metal section as a reference voltage for the transistor. Of course this draws very little current so that the electrical components are arranged to consume power of 1 µA or less. In this way the circuit can be very simple and consist solely of a transistor and a resistor. Other low power limiters can be used but typically higher power regulators are not suitable as they draw more current than is saved by limiting the current between the anode and the rebar. In addition in another arrangement there is provided a second sacrificial anode and the electrical components use a voltage difference between two anodes and a resistor to generate a reference current for the electrical component.

Typically the current can be limited to the maximum value to within +1-20%, 10%, 5%, 2% depending on the stability of the voltage source, the gain of the transistor and the resistance of the resistor.

Preferably the electrical components form part of a combined unit which includes the anode and a connector for connection to the reinforcing bar, for example an arrangement of the type as described above.

Preferably the current limiter described above is associated with and operates only in respect of a single anode and is not part of a larger system limiting or regulating current to a plurality of anodes.

In one particularly preferred method, the anode is installed and connected to the metal section while the ironically conductive material is unset and the limitation of the current by the electrical components prevents gas generation during curing of the ionically conductive material. The generation of gases during setting is a severe problem in that it forms bubbles in the concrete.

The arrangement described herein can be used in a system where the voltage difference is generated by a storage component of electrical energy with two poles for communicating electrical current generated by release of the electrical energy and by electrically connecting one pole to the metal section and by electrically connecting the other pole to the anode. However the same current limiting system and the same mechanical connection can be used with sacrificial or galvanic anodes and also with combined systems where there is both an impressed current anode driven by a power supply and a separate sacrificial anode.

In this arrangement, preferably the anode and the storage component are both at least partly contained in or buried in the ionically conductive material, typically concrete.

In this arrangement preferably the storage component is connected as a single unit with an impressed current or non-sacrificial anode and/or with a sacrificial anode.

In this arrangement preferably the storage component is contained within a closed or sealed canister defining the anode on an exterior surface. In this case the anode can be formed of stainless steel.

In this arrangement in some cases in order to provide a longer life replacement electrical energy can be introduced by re-charging the storage component or by replacing the storage component.

The storage component can be a cell or battery of cells or can be a capacitor.

The arrangement therefore described above provides an arrangement which acts to limit the current between the anode and the reinforcing bar. This arrangement can provide one or more of the following features:

It acts to regulate current from a battery or galvanic anode.

It uses the voltage difference across the poles of the energy storage device or between the energy storage device and the steel or between the galvanic anode and the steel as a reference voltage.

It provides a simple limiting system typically formed of two components only including a conventional transistor or FET and a resistor which determines the regulating voltage of the transistor.

The circuit consumes almost no power and may be as low as 1 µA or less.

This is ideal for battery or galvanic anode systems as these have limited capacity (limited stored energy) and do not function after limited capacity is consumed.

The current can be limited over wide range of circuit resistances from short circuit to resistance where the available voltage is sufficient to result in the set current value.

The current can be regulated to within +20%, 10%, 5%, 2% depending on the stability of the voltage source (battery/anode).

The current limiter can be part of a combined unit which includes battery or capacitor or anode and connector.

The current limiter allows batteries/high output anodes to be installed and connected to the steel in fresh concrete/mortar without detrimental effects of high current densities discharging through the low resistance fresh material. Can be used to prevent gas generation (oxygen and hydrogen) during curing which will create gas bubbles, voids, reduce bond to the steel and leave pores/capillaries in the concrete/mortar. Pores/cavities allow direct path to steel for water and salts to penetrate and $CO_2$ to carbonate the concrete. All of which lead to premature corrosion of the steel.

Where, as stated above the anode is not sacrificial to the metal section, typically the material is therefore electropositive relative to the metal section. However some part of the anode may be sacrificial or the anode may be fully sacrificial.

The arrangement herein can be used where the anode is in the form of a plurality of associated anodes all connected to the cell or battery of cells.

The storage component as defined above can be a cell or battery or battery of cells/batteries or it can be a capacitor or a supercapacitor or ultracapacitor which provides a system for storing charge different from conventional electrolytic cells or batteries. A supercapacitor is a high-capacity electrochemical capacitor with capacitance values much higher than other capacitors. These capacitors typically have lower voltage limits than standard or conventional capacitors. They typically store 10 to 100 times more energy per unit volume or mass than standard capacitors, can accept and deliver charge much faster than batteries, and tolerate many more charge and discharge cycles than rechargeable batteries. Supercapacitors do not use the conventional solid dielectric of standard capacitors. They use electrostatic double-layer capacitance or electrochemical pseudo-capacitance or a combination of both instead. Electrostatic double-layer capacitors use carbon electrodes or derivatives with much higher electrostatic double-layer capacitance than electrochemical pseudo-capacitance, achieving separation of charge in a Helmholtz double layer at the interface between the surface of a conductive electrode and an electrolyte. The separation of charge is of the order of a few ångströms (0.3-0.8 nm), much smaller than in a conventional capacitor.

Supercapacitors are a great advancement on normal capacitors being capable of storing a high charge once fully charged. The capacity of a 2.7V 200 F supercapacitor is capable of holding a charge of the order of over 500 C (A×seconds). Typical cathodic protection systems require around 170 to 400 $C/m^2$ of steel per day so such a capacitor is able to provide, when fully charged, enough charge to protect 1 $m^2$ or more of steel for a day. This represents 2-5 $mA/m^2$ current density. In order for example to double this figure then we need to double the capacitance to around 400 F. If the capacitor is recharged on a daily basis, then logistically a system utilising supercapacitors of this size spaced at intervals to provide current for 1 $m^2$ or more of steel can be an effective cathodic protection system. Daily recharging can easily be provided by solar panels, for example, but other means of producing reasonably regular bursts of current could be used as charging components for the supercapacitors. An example of such could be piezoelectric materials which can be incorporated in roads, parking garages, bridges, runways etc. enabling current to be generated by loading and/or movement of the structure or vehicles passing over them.

That is, piezoelectric materials could be used to generate electricity to power an impressed current system directly, or to charge/recharge batteries or capacitors/supercapacitors.

In some embodiments the anode is a sacrificial anode formed of a material which is less noble than the metal section to be protected. However in other cases the anode is not less noble than the metal sections to be protected so that it is the same as the metal, typically steel or is more noble than the steel; so that it is partially or fully inert during the process. If the anode is formed of a sufficiently inert material anode it does not corrode significantly during the flow of the electrons.

High current output is required from the storage component such as a battery. As described above, one pole is connected to the metal section to be protected. Electrons flow from the storage component to the metal section such that corrosion of the metal section is reduced. The other pole is connected to an anode or if suitable, the casing of the storage component itself can be used as the anode. In the case of a zinc-alkaline battery the polarity of the battery is such that the case of the battery, if it is made of a suitable material will act as the anode and will be able to distribute the necessary current through the ionically conductive material such as mortar or concrete. Other batteries, such as most lithium batteries, typically have only a small pole which has the proper polarity which may not be large enough to deliver the required current into the ionically conductive material. A separate anode can be provided for connection to the appropriate pole. The anode may encase or coat the whole storage component such as a battery or capacitor. Anodes can be made of any inert conductive material such as MMO coated titanium or other noble metal or sub-metal, conductive coating, conductive ceramic material etc. and can be embedded in an alkaline mortar or an inert material such as sand which may be dosed with an alkali solution. Stainless steel can also be a suitable current carrier when embedded in mortar or compacted sand dosed with alkali such as a saturated solution of lithium hydroxide. Anodes may also comprise sacrificial materials such as zinc which are less noble than the metal section to be protected.

Preferably in some embodiments the storage component is initially charged or is subsequently re-charged while in situ that is while in contact with the ionically conductive material. The arrangement may include or preferably includes automatic switching systems to effect the periodic charging process. For example the storage component can be charged by a solar cell or by an outside power source such as a second battery or a power supply. Also in some cases there may be provided a system which operates to subsequently automatically and repeatedly or periodically carry out the re-charge.

In another case, the storage component is subsequently re-charged by a recharging power supply which is an integral unit with the anode and the storage component. However the system also may operate as a periodic maintenance programme where a power supply is brought into operation periodically as required to effect the re-charging of an anode assembly or a set of anode assemblies in a structure.

Preferably the storage component is subsequently re-charged by applying voltage directly between both terminals or between a first connection to a terminal of the storage component and a second connection to the metal section.

In one arrangement the anode comprises sacrificial anode material, or the anode, which is sacrificial to the metal section, is collated with or in electrical contact with a body of sacrificial anode material which gives a boost of current until the sacrificial anode material is consumed, following which the current discharge is through the anode.

In one arrangement storage component is connected to the metal section and is charged, in an initial charging step or in a subsequent re-charging, after installation by a connection to the one terminal and a second connection to the metal section. This method of connection acts to pass extra current to the metal section during the charging or re-charging step to passivate the metal section or reduce future current requirement to maintain passivity or mitigate corrosion of the metal section.

Typically the single unit comprising the storage component and the anode or anodes is at least partly buried in the ionically conductive material. However application to the surface or other modes of mounting where the anode is in ionic contact with the material can be used.

In one particularly preferred arrangement the storage component comprises a cell with an outer case wherein the case is fully or partially formed of the anode material so that the anode is formed by the outer case either by an outer surface of the same material or as a coating or layer on the exterior of the case. In this case the outer case or at least the outer layer can be formed of a material which is more noble than steel. In this arrangement the anode forms directly the outer case of the cell where the case contains and houses the cathode material of the cell the electrolyte, the anode material and other components of the cell. That is, in this embodiment, the anode is defined by a layer or coating on the outer surface of the storage component itself or actually as the outer surface of the storage component and not as an additional element which is separate from the storage component. Where the storage component is a cell, the outer case of the cell can directly carry the material of the anode or even the outer case of the cell is the anode. The anode material may cover the whole surface or may be a partial covering leaving other areas exposed.

In another case the case and the anode are formed independently and the anode forms a separate body which conforms in shape to the outer case of the cell. Typically such cells are cylindrical but other shapes can be used. This arrangement is particularly applicable where the cell is replaceable rather than rechargeable to introduce the additional energy after the original cell is sufficiently depleted to be no longer effective.

In another case the anode is a separate body which is electrically connected to one terminal of the storage component.

The above features can be preferably used for protection of steel reinforcing or structural members in concrete or mortar material where it is well known that corrosion can cause breakdown of the concrete due to the expansive forces of the corrosion products and due to the reduction to the steel strength. However uses in other situations can arise.

The term impressed current anode used herein is intended to distinguish from the sacrificial anode where the sacrificial anode is formed of a material, typically of zinc, which is less noble than the metal section so that it preferentially corrodes relative to the metal section to be protected. The impressed current anode is one which is used in conjunction with an external power supply and does not need to be less noble than the metal section. Typically such impressed current anodes are formed of titanium, platinum, niobium, carbon and other noble metals and oxides which do not corrode readily, or they can be formed of iron or less noble materials such as zinc.

For use during a sacrificial or galvanic phase of operation of the above method, the ionically conductive filler material preferably contains at least one activator to ensure continued corrosion of the sacrificial anode. However the activator can also be located at other positions in the system. Suitable filler materials can be in the form of solids, gels or liquids.

Gels can include carbomethyl cellulose, starches and their derivatives, fumed silica or polymer gel electrolytes, e.g. acrylic acid in a potassium hydroxide solution or polyvinyl chloride/acetate-KOH composites with additions of bentonite, propylene carbonate and or alumina. The alkali hydroxide in these gels acts as a suitable activator.

Suitable activators include alkali hydroxides, humectants, catalytic materials and other materials which are corrosive to the sacrificial anode metal. Activators may be used alone or in combination.

For use during a sacrificial or galvanic phase of operation of the above method, the ionically conductive filler material preferably has a pH sufficiently high for corrosion of the sacrificial anode to occur and for passive film formation on the sacrificial anode to be avoided. Alternatively, the filler may have a lower pH and/or contain other activators for corrosion of the sacrificial anode to occur and for passive film formation on the sacrificial anode to be avoided.

The anode and methods herein are preferably designed for use where the metal section is steel and the ionically conductive material is concrete or mortar.

The anode apparatus including the impressed current and sacrificial components is typically buried in the concrete or other solid material so that it is fully encased by the concrete or a filler material, but this is not essential and the anode may be only partially buried or in direct or indirect physical or ionic contact with the concrete.

The anode apparatus including the impressed current and sacrificial components may be surrounded by an encapsulating material or ionically conducting filler material which may be a porous material or porous mortar material. Suitable encapsulating materials can be inorganic or organic and may be any ionically conductive cementitious, polymer or non-cementitious material or mortar including geopolymers or modified Portland cements. The encapsulating material may be solid, gel or liquid and may be deformable.

The power supply may include a solar panel which drives the impressed current anode and rechargeable galvanic anode so as to provide long term protection when the solar power is on and off.

The construction and methods proposed herein are designed particularly where the metal section is steel and the ionically conductive material is concrete or mortar. However the same arrangements may be used in other corrosion protection systems such as for pipes or other constructions in soil, and in many other systems where such anodes can be used.

Preferably the assembly includes a reinforcing layer, such as disclosed in U.S. Pat. No. 7,226,532 issued Jun. 5, 2007 to Whitmore, the disclosure of which is incorporated by reference or to which reference may be made for further details not disclosed herein, to restrain and resist forces such as expansion, contraction and deformation forces which may be caused by corrosion of the anodes, deposition of sacrificial anode ions and other physical/environmental forces such as freezing, thawing, wetting, drying and thermal expansion/contraction.

The invention as defined and described herein can also be provided as an assembly, as opposed to a method for cathodically protecting and/or passivating a metal section in an ionically conductive material. Thus the following definitions of the invention presented herein are included herein. Each of these independent definitions can be used in conjunction with any one of or all of the subsidiary features as defined above.

BRIEF DESCRIPTION OF THE DRAWINGS

Embodiments of the invention will now be described in conjunction with the accompanying drawings in which.

In the drawings like characters of reference indicate corresponding parts in the different figures.

DETAILED DESCRIPTION

Figure 1:
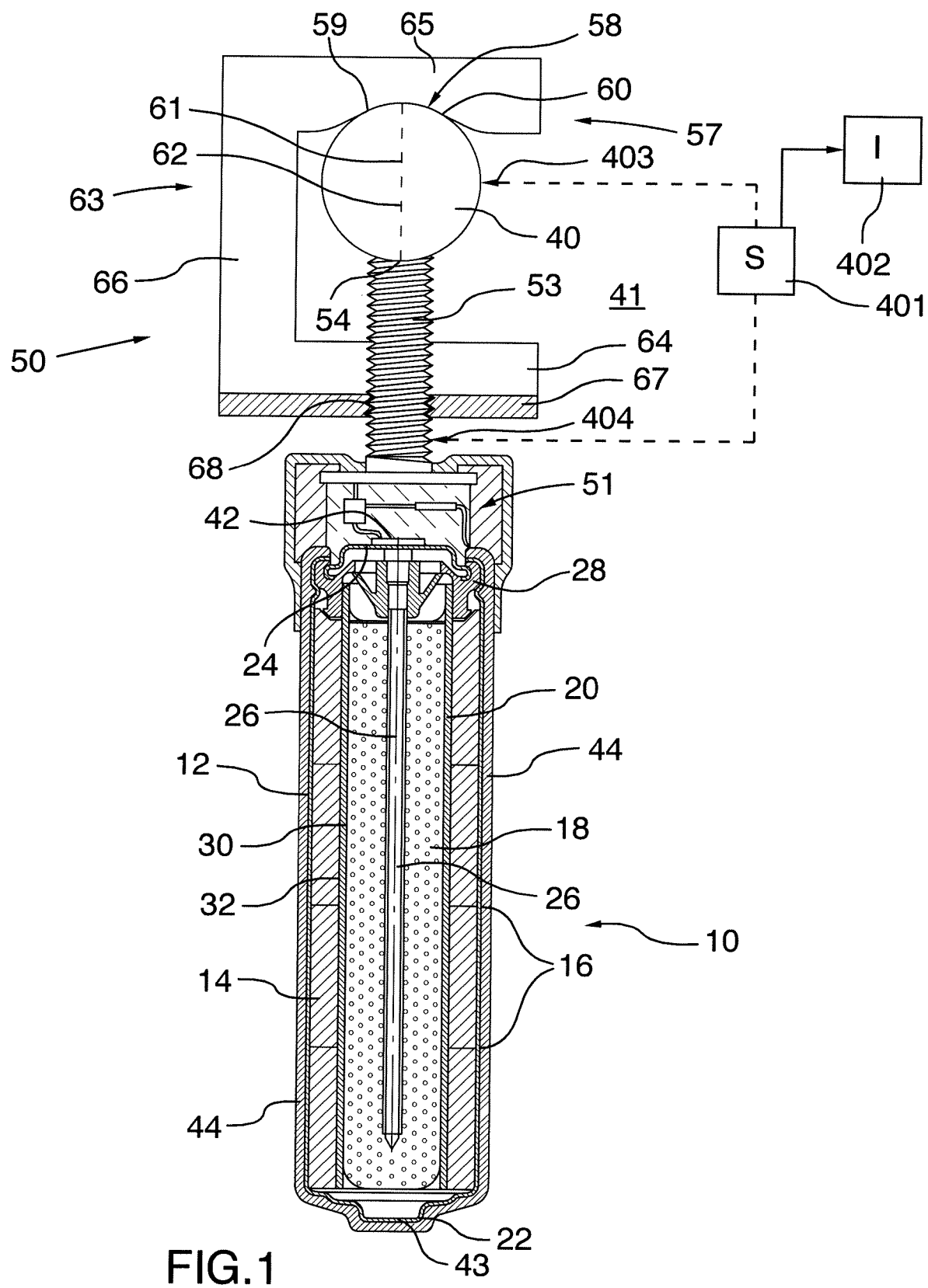
FIG. 1 is a cross-sectional view of an anode assembly for use in a corrosion protection method according to the present invention.

In the example shown in FIG. 1 there is provided a cell which may be rechargeable, as shown in prior co-pending application Ser. No. 15/341,532 filed Nov. 2, 2016, the disclosure of which may be referenced or is incorporated herein by reference, or may be a simple non-rechargeable cell. The cell may form part of the anode structure or the anode and the cell may be physically separated. As shown in FIG. 1, an anode body 10 is defined by a typical alkaline manganese dioxide-zinc rechargeable cell comprises the following main units: a steel can 12 defining a cylindrical inner space, a manganese dioxide cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity (electrolyte) between the anode and the cathode is provided by the presence of potassium hydroxide, KOH, electrolyte added into the cell in a predetermined quantity. Other types of rechargeable cells comprise similar main components (can, cathode, anode, separator and electrolyte) but the composition of the components may differ. Some of the types of cell may however be of a different construction such as lead/acid cells or lithium cells.

The can 12 is closed at the bottom, and it has a central circular pip 22 serving as the positive terminal. The upper end of the can 12 is hermetically sealed by a cell closure assembly which comprises a negative cap 24 formed by a thin metal sheet, a current collector nail 26 attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively.

The material of separator 20 consists of two different materials, i.e.: a first material 30 made of fibrous sheet material wettable by the electrolyte, and a second material 32 being impermeable to small particles but retaining ionic permeability. An expedient material for the first layer is a sheet material of non-woven polyamide fiber, which is absorbent and serves as a reservoir for electrolyte. The macro-porous structure of the absorbent layer cannot prevent internal shorting by zinc dendrites or deposits during discharge/charge cycling.

Shorting is prevented by the second 32 material which may be a layer or layers of micro-porous or non-porous material which may be laminated to or coated onto the fibrous sheet material. One suitable material is one or more cellophane membranes laminated to the non-woven polyamide sheet. Another is one or more coatings of regenerated cellulose or viscose coated onto and partially impregnating the non-woven polyamide sheet, resulting in a composite material.

Other types of rechargeable cells may be used. In the present arrangement, the type described above is used in a method for cathodically protecting and/or passivating a metal section such as steel reinforcing bar 40 in an ionically conductive material such as concrete 41. The cell therefore includes a first terminal 42 and a second terminal 43 defined by the outer casing 12. The first terminal 42 is connected to the pin or nail 26 which is engaged into the anode material 18. The terminal 42 connects to a connecting wire 42A which extends from the terminal 42 for eventual connection to the steel reinforcing bar 40 as shown in FIG. 1 through the mounting assembly generally indicated at 50 which mechanically and electrically attaches the anode body to the bar 40.

In FIG. 1, an anode 44 is applied as a coating onto the casing 12 of the cell. In this embodiment the anode 44 is of an inert material so that it is more noble than steel. Examples of such materials are well known. Thus the anode material 44 does not corrode or significantly corrode during the cathodic protection process.

In this arrangement the application of the anode 44 onto the outside surface of the casing 12 provides the structure as a common single unit where the anode is directly connected to the cell and forms an integral element with the cell. Anode 44 may comprise one or more layers and may include a mixed metal oxide (MMO), catalytic or sub-oxide layer.

In this embodiment, as the anode 44 is formed of an inert material which does not corrode in the protection process, the anode and the cell contained therein can be directly incorporated or buried in the concrete or other ionically conductive material without the necessity for an intervening encapsulating material such as a porous mortar matrix. As there are no corrosion products there is no requirement to absorb such products or the expansive forces generated thereby. As the process does not depend upon continued corrosion of a sacrificial anode, there is no necessity for activators at the surface of the anode. As the chemical reaction at the surface of any inert anode during operation generates acid (or consumes alkali) it is beneficial for the anode to be buried in an alkaline material such as concrete or high alkalinity mortar to prevent material near the anode from becoming acidic. If desired, additional alkali may be added to the concrete or other material the anode is in contact with.

The apparatus shown herein includes an anode body generally indicated at 10 which is connected to the reinforcing bar 40 by the mounting assembly generally indicated at 50. In addition, the anode body includes a current limiting system generally indicated at 51 which limits the flow of current from the anode body to the bar 40.

As previously described, the anode body can be defined by a power supply typically in the form of a cell with the anode 44 on the outside surface of the cell and with the other terminal of the cell provided at the end of the cell for connection to the bar 40.

In other embodiments described hereinafter the cell can be omitted in which case the anode body comprises a sacrificial material which is less noble than the steel rebar, such as zinc where a voltage between the anode and the bar comprises the galvanic voltage between the two metal components.

In yet another embodiment, the anode body can comprise a combination of both an impressed current anode and a sacrificial anode.

In this way the anode body is constructed and arranged so that when the anode is ionically connected to the concrete, a voltage difference is generated between the anode 44 and the bar 40 so as to cause a current to flow through the concrete between the anode and the bar 40 so to provide cathodic protection and/or passivation of the reinforcing bar in the concrete.

Figure 2:
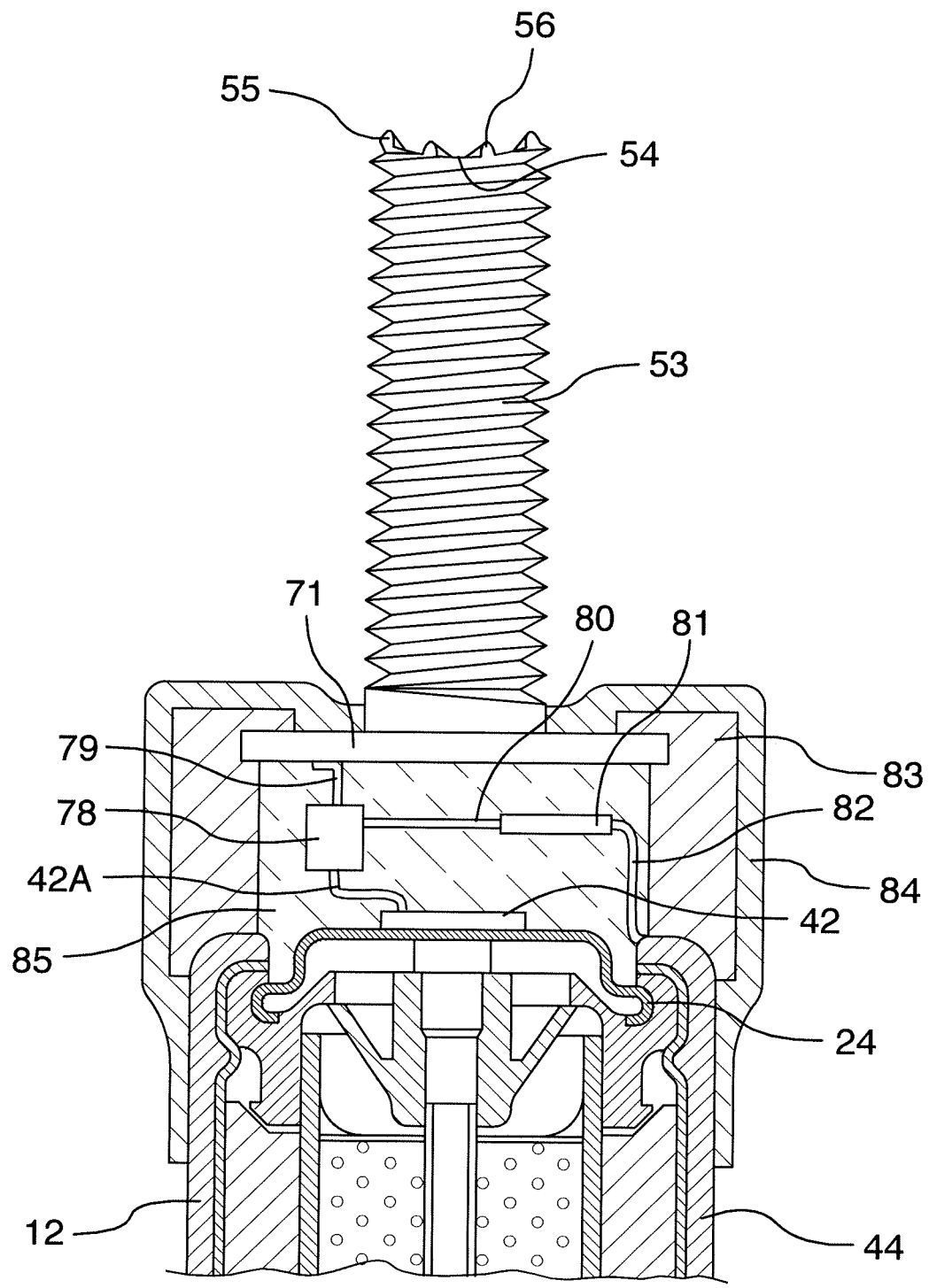
FIG. 2 is an enlarged view of the current limiting circuit for use with a cell and the mounting of the first abutment on the anode body.
Figure 3:
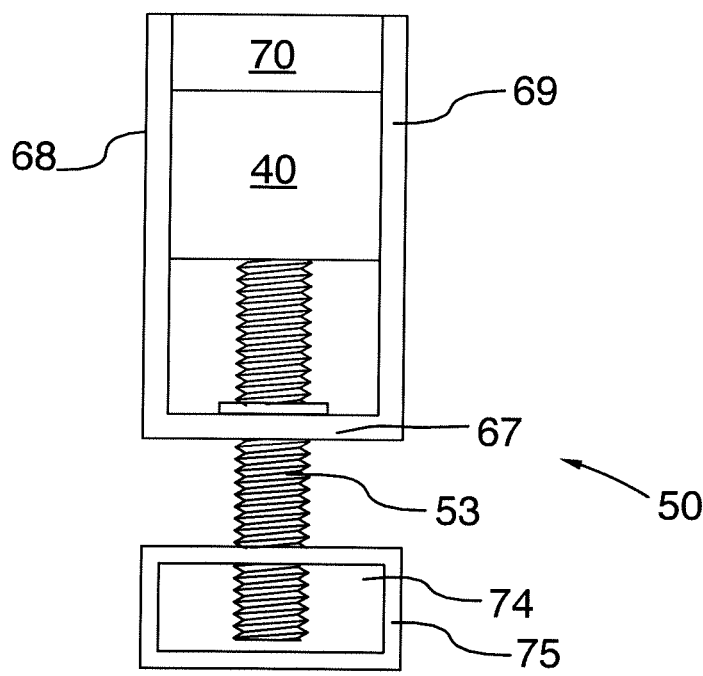
FIG. 3 is a front elevational view of an anode assembly similar to that of FIG. 1 where the anode body uses a sacrificial anode.
Figure 4:
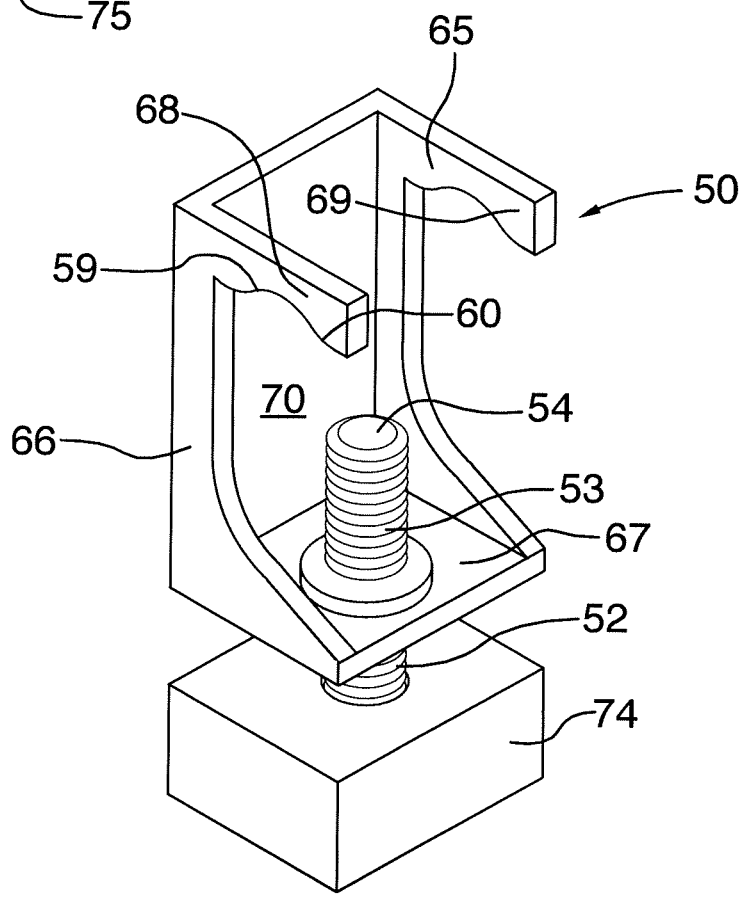
FIG. 4 is an isometric view of the anode assembly of FIG. 3.

In the embodiment shown in FIGS. 1, 3 and 4, the mounting assembly 50 comprises a first abutment 52 in the form of a threaded rod 53 which is attached at one end to the anode body 10. An opposed end 54 of the threaded rod forms a front face for engaging one side face of the bar 40. As shown in FIGS. 2 and 4, the end face 54 of the threaded rod 53 includes a peripheral circular edge 55 and intervening projections 56 which are arranged to bite into the surface of the bar 40 when in compressed contact therewith.

The mounting assembly 50 further comprises a second abutment 57 for engaging generally the opposed the face of the bar 40 at a surface 58. In general the second abutment forms a hook member which contacts the opposite or rear surface of the bar 40 at least at two positions 59 and 60 on either side of a diameter 61 extending through the bar 40 from the face 54. In this way the bar 40 is contacted by three points 54, 59 and 60 which are spaced around the axis 62 of the bar system to provide a stable engagement.

The hook member defined by the surfaces 59 and 60 forms a part of a C-shaped structure 63 with a bottom crossmember 64 and a top crossmember 65 carrying the surfaces at 59 and 60. These cross members are interconnected by an outwardly extending a leg 66 which extends parallel to the threaded rod 53. The crossmember 64 includes a flange 67 at right angles to the threaded rod 53 with a threaded hole 68 through the flange which acts as a nut on the threaded rod so the rotation on the threaded rod causes the nut to be driven toward the anode body to pull the surfaces 59 and 60 toward the surface 54 to clamp the bar 40 therebetween.

The surfaces 59 and 60 can also be formed with teeth or other projections 59A or a sharp cutting edge 59B which bite into the surface of the bar 40 and cooperate with the teeth 55 and 56 of the face 54. In this way a strong physical connection is provided between the first and second abutment and the bar 40 and also a strong electrical connection is provided between the rod 53 and the bar 40. These teeth or sharp cutting edges on some or all contacting surfaces can bite into any contaminant such as corrosion or concrete residue on the surface of the rebar to ensure an effective engagement and electrical contact with the metal of the rebar. That is each of the first and second abutment members includes components for cutting into a surface of the reinforcing bar thus avoiding the necessity to clean the surface of the bar.

In accordance with another independent feature of the invention, in order to ensure that the projections and cutting edges provide the necessary engagement with the metal of the rebar, a sensor can be provided which measures the effectiveness of the connection. This can be done for example by measuring the resistance across the connection by bridging the rebar and a point on the connection to ensure that the resistance of the connection meets the necessary low level of resistance. This output is provided to an indicator to output to the installer an indication for example visually or audibly as to whether the connection properly meets the set standard.

The hook member can comprise a single body on one side of the rod 53. However as best shown in FIG. 4, typically the hook member is formed by two separate hook portions 68 and 69 connected by a backplate 70. In this way the rod 53 is contained between the portions of 68 and 69 and in front of the backplate 70. The hook portions of 68 and 69 each include surfaces 59 and 60 which engage the rear surface of the bar 40. Thus the forces pulling the second abutment member toward the anode body pull on both hook portions and on both surfaces 59 and 60 providing four points of engagement which cooperate with the single point of engagement from the surface 54 of the rod 53.

In this embodiment the female threaded portion is provided by a threaded hole through the flange 67. A screw action pulling the second abutment member toward the anode body is therefore provided by rotating the rod 53. This can most effectively be done by grasping manually the anode body and using it as a handle to turn the rod 53. Of course this requires a strong connection between the bottom end of the rod 53 and the anode body. In the arrangement shown in FIG. 2, this connection is provided by a base plate 71 attached onto the bottom end of the rod 53 and engaged firmly into the upper end of the anode body. In an arrangement using a solid anode 74 of a sacrificial material, the rod 53 can be cast into the interior of the anode body to provide the necessary structural and electrical connection. In FIG. 3, the solid anode body 74 includes a conventional covering of a mortar material 75 for purposes of retaining corrosion products and of carrying conventional activating materials described herein before.

In another arrangement (not shown) the female threaded portion engaged on the rod 53 can be formed by a separate nut which itself can rotate relative to the second abutment member on the flange and 67. In this embodiment rather than rotate the rod, the nut can be rotated to drive the flange 67 toward the anode body. Other arrangements of threaded connection are also possible to drive the second abutment member toward the anode body. In another example, the hook is part of the anode body and the screw is turned to press the rebar against the hook.

Turning now to FIG. 2, there is shown in more detail the connection between the terminal 42 of the cell and the rod 53 which is electrically connected to the bar 40 as described above.

The terminal 42 is connected to a wire 42A which in turn is connected to a transistor 78. An output wire 79 of the transistor 78 is connected to the base plate 71 connected to the rod 53.

The transistor 78 can be a conventional transistor in which case a base of the transistor 78 has a control current provided by a wire 80 connected through a resistor 81 in turn connected through a wire 82 to the positive terminal of the battery connected to the anode 44.

The transistor 78 can also be an FET in which case the wire 80 controls a gate of the FET through the resistor 81.

As the transistor 78 is connected to the steel bar 40 and the wire 82 is connected to the anode 44, the control current to the transistor 78 is determined by the voltage across the cell and the resistance of resistor 81. As this voltage is typically relatively constant at least until the cell is in its later stages of life, this constant control current controls the amount of current flowing through the transistor from the cell to the bar 40. As is well known the resistor 81 can be selected to provide a control base current to the transistor which sets the current flow through the transistor to a maximum value. This maximum value is retained regardless of the conductivity between the anode 44 and the bar 40 through the concrete. As the conductivity through the concrete is very high, for example during an initial installation, the current is maintained at the maximum value. As the conductivity through the concrete falls to a lower level, the current is maintained at the desired level until the maximum voltage of the cell is reached. If the conductivity falls to a yet lower level, the current through the transistor also falls dependent upon the conductivity and is not maintained by the action of the transistor. The simple circuit therefore provided by the resistor and the transistor does not act as a regulator but instead merely acts as a current limiter.

Figure 2A:
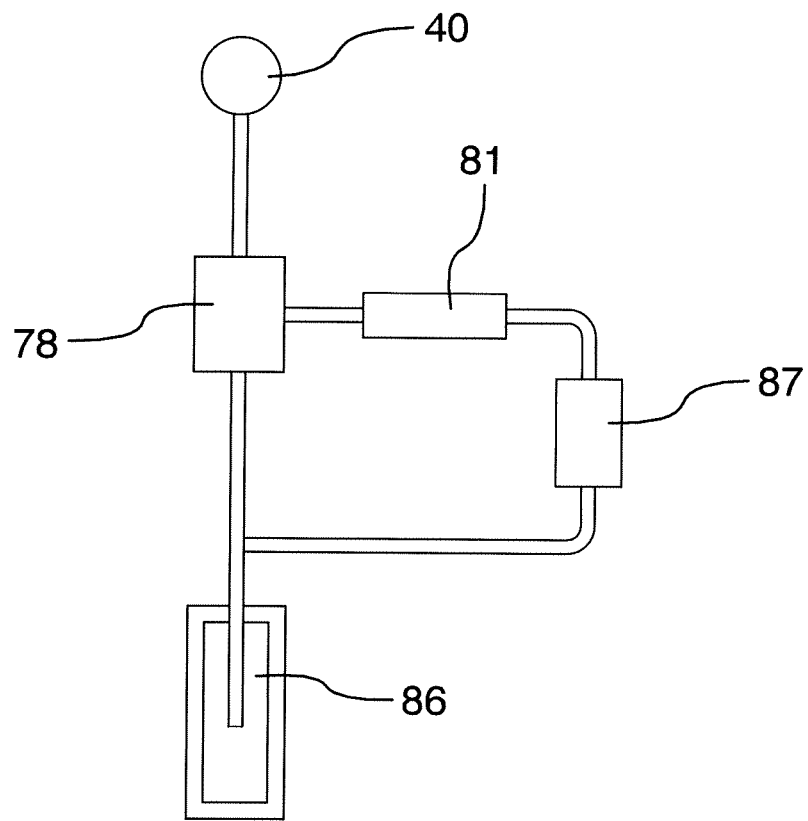
FIG. 2A is a schematic illustration of the current limiting circuit for use with a galvanic anode which uses a battery voltage to generate the reference current.
Figure 2B:
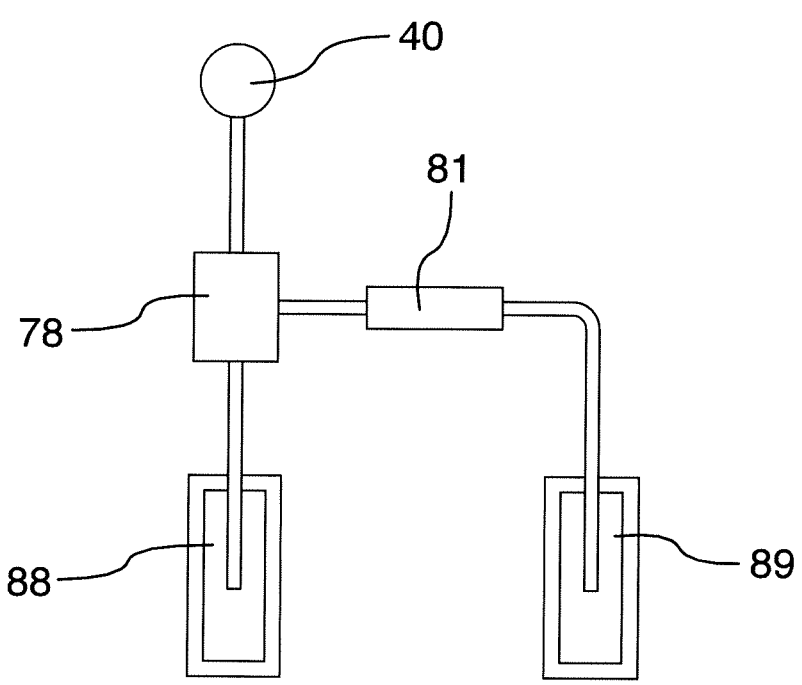
FIG. 2B is a schematic illustration of the current limiting circuit for use with a galvanic anode which uses two anodes where the second anode is used to generate the reference current.

FIGS. 2A and 2B show applications of the current limiting device in use with a galvanic anode.

FIG. 2A shows galvanic anode 86 connected to transistor 78. A separate battery 87 is connected to resistor 81 and is connected to transistor 78 to provide the control current to the transistor such that the transistor controls the maximum current flowing to the bar 40.

FIG. 2B shows a galvanic anode 88 connected to transistor 78. In this case the control current to the transistor is provided by a second galvanic anode 89 and resistor 81. As in the example described above, the control current controls the maximum current flowing to the bar 40.

Figure 2C:
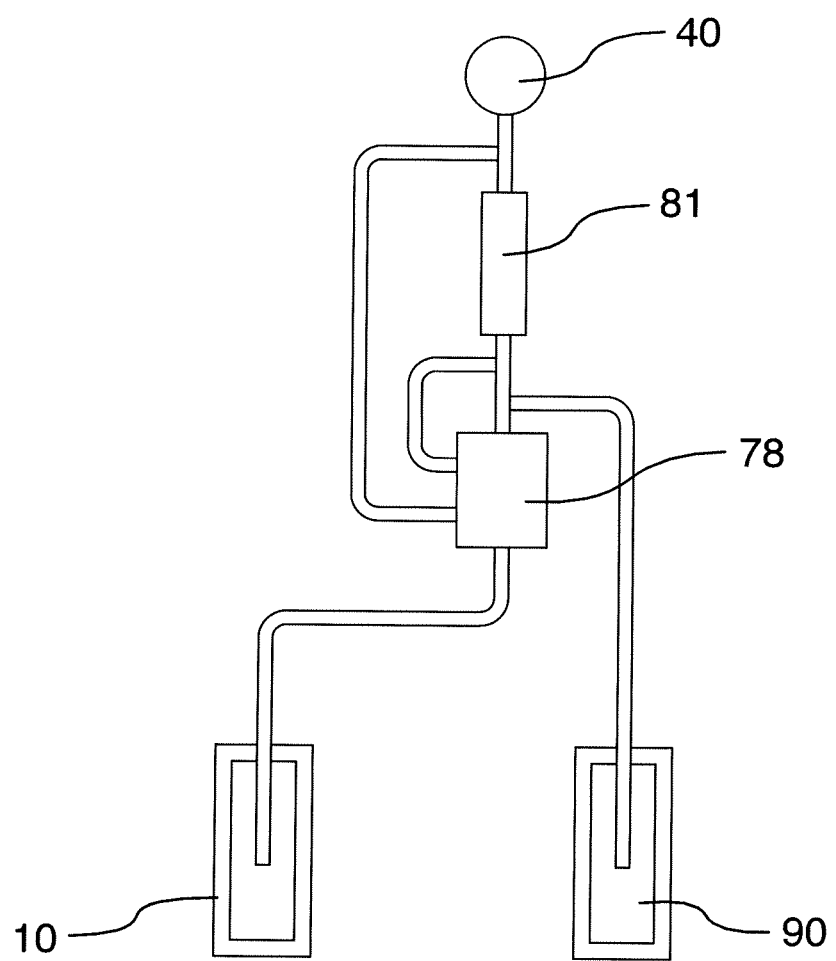
FIG. 2C is a schematic illustration of the current limiting circuit for use with a system in which both an impressed current anode with the battery supply and a galvanic anode are used and wherein the voltage across the resistor is used to control the FET.

FIG. 2C shows a current limiting circuit for use with a system in which both an impressed current anode 10 with the battery supply and a galvanic anode 90 are used and wherein the voltage across the resistor 81 is used to control the FET 78. The output from the anode 10 and the anode 90 is added downstream of the FET and the current from the anode 10 generated by the battery is limited using the current limiting circuit. In this way the current from the impressed current anode is used to "top up" the current from the galvanic anode to maintain a current which is adequate to provide the required protection. As is known the current from the anode 90 can vary due to changing conditions in the concrete so that the top up from the battery is used only when required. As the current taken from the battery is now limited, the system can be designed such that the life of the battery can match the life of the anode 90.

If the electrical circuit includes a normally closed FET, the FET can allow current to flow unimpeded from the galvanic anode 86 to the bar 40 after the separate battery or separate galvanic anode described above ceases to function.

This limitation of the current to a maximum value set during manufacture by the selection of the resistor 81 can ensure that the current remains during the life of the system at a relatively low level so as to dramatically increase the lifetime of the cell from a typical value in the absence of the current limiter which could be of the order of one year up to a more suitable lifetime of 10 years for example. In this way the current is maintained at a value which is suitable for cathodic protection but at no time is there any excess current over and beyond this desirable value which may damage the concrete or deplete the cell prematurely such that corrosion protection is not provided for the desired timeframe.

This arrangement is particularly valuable in relation to an arrangement which uses a non-sacrificial impressed current anode and a cell as the power supply for generating the required voltage. In such an arrangement the current generated between the anode 44 and the bar 40 can in some circumstances significantly exceed the desirable value. In addition the mechanical mounting of the anode body on the reinforcing bar provides an effective electrical connection. Furthermore the strong physical connection between the anode body and the bar ensures that the anode body can be located at a required orientation relative to gravity such as where the anode body is to one side of the bar or above the bar as required.

In order to connect the terminal 42 to the rod 53, there is provided an insulating or protective collar 83 surrounding the transistor 78 and the resistor 81. The bottom end of the collar is attached to the top end of the cell and the top end of the collar receives the base plate 71 in a suitable receptacle portion. The collar 83 is attached to the cell 44 by a surrounding insulating layer 84 of a suitable plastic material. Inside the collar 83 is provided a conventional potting material 85 which surrounds the electrical components and wires to maintain connection and to prevent damage from moisture penetration. The structure is thus sufficiently strong to ensure that the base plate 71 is attached to the cell in a manner which allows the cell to be grasped manually and rotated as an operating handle to rotate the rod 53.

Figure 5:
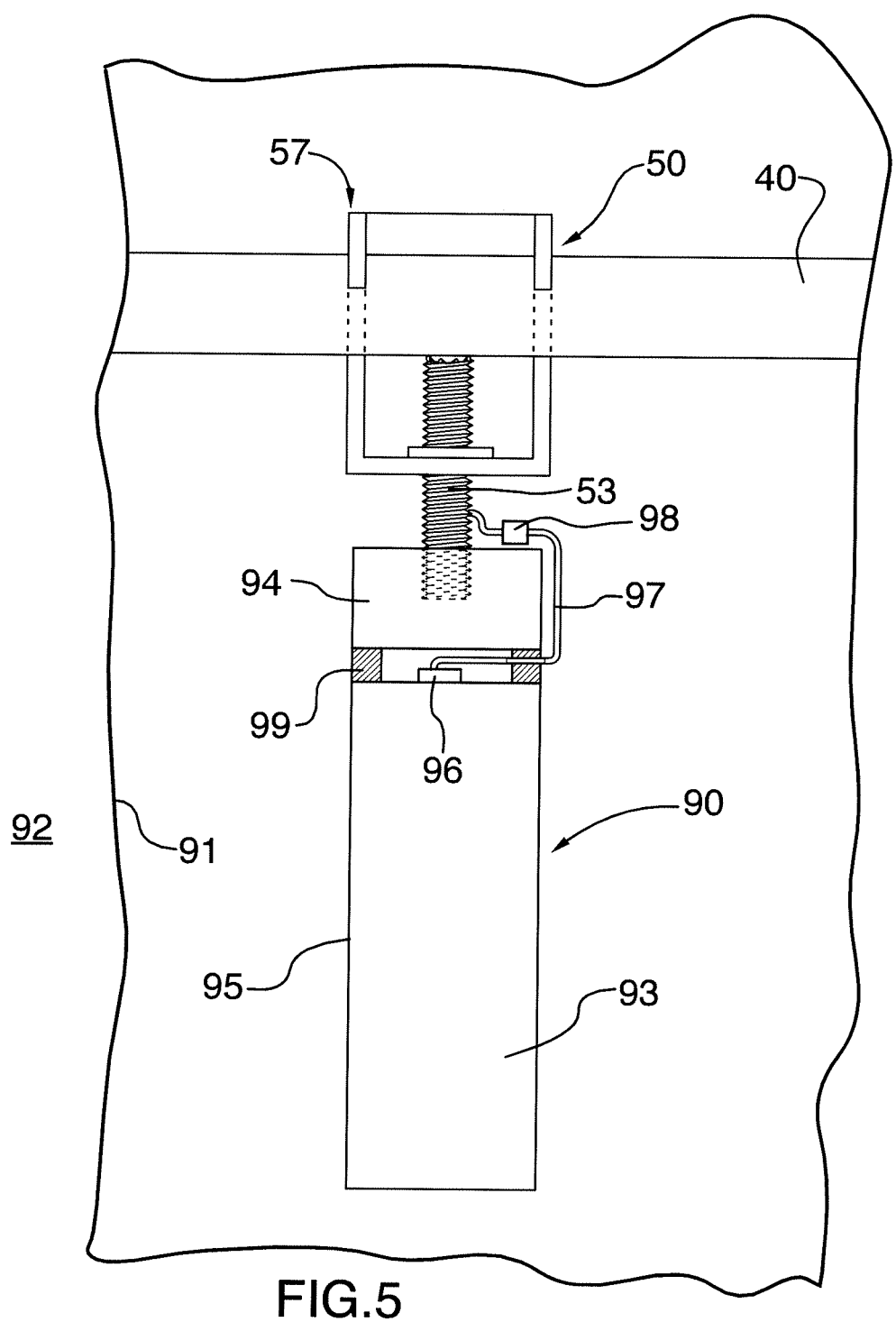
FIG. 5 is a top plan view of an anode assembly similar to that of FIG. 1 laid in a patch repair in a concrete assembly ready for the addition of fresh unset concrete to be applied to the patch.

As shown in FIG. 5, and anode body generally indicated at 90 is mounted within a patch repair 91 in a concrete material 92. The anode body includes a mounting assembly 50 as previously described including a rod 53 and a hook portion 57. In this embodiment the anode body 90 is formed of a cell 93 and portion 94 of a sacrificial material. The cell 93 has an outer surface 95 which acts as an impressed current anode. The cell has a terminal 96 which is attached by a wire 97 including a diode 98 which transmits voltage from the terminal 96 to the rod 53. During an initial operating period, therefore, the system operates primarily as an impressed current system where the cell generates a majority of the flowing current between the anode at 95 and the bar 40. However when the cell is depleted, the cathodic protection is taken over by the sacrificial anode 94 which is directly connected to the rod 53. In this arrangement the diode 98 prevents the reverse flow of current through the cell 93 which could act to reverse the sacrificial process and instead more actively corrode the steel. The cell 93 and the anode 94 are suitably connected by a structural mounting element 99 shown only schematically which physically attaches the cell to the anode 94 sufficiently to prevent the cell from breaking away from the anode during installation.

As shown in FIG. 5, the anode body 90 stands outwardly to one side of the bar 40 horizontally within the patch. In this way the anode body is supported at a spaced position from the bar 40 defined by the length of the rod 53 and the mechanical connection of the clamping assembly. The mechanical connection of the clamping assembly ensures that the anode body remains in its horizontally extending orientation during the filling of the patch 91 with additional concrete. During the setting of the additional concrete, the current limiting system described above prevents the generation of gases at the surfaces of the anode and the rebar which can enter the setting concrete and cause significant damage to the concrete. Since various modifications can be made in my invention as herein above described, and many apparently widely different embodiments of same may be made within the spirit and scope of the claims without department from such spirit and scope, it is intended that all matter contained in the accompanying specification shall be interpreted as illustrative only and not in a limiting sense.

The invention claimed is:

1. A method for cathodically protecting and/or passivating a steel reinforcing member in an ionically conductive concrete or mortar material, comprising:
   providing an anode for communication of an electrical current to the steel reinforcing member in the ionically conductive concrete or mortar material;
   generating a voltage difference between the anode and the steel reinforcing member so as to cause a current to flow through the ionically conductive concrete or mortar material between the anode and the steel reinforcing member so as to provide cathodic protection of the steel reinforcing member;
   wherein the anode is an impressed current anode;
   and wherein the voltage difference is generated by a storage component of electrical energy with two poles for communicating electrical current generated by release of the electrical energy and by electrically connecting one pole to the steel reinforcing member and by electrically connecting the other pole to the anode;
   and providing current limiting components which limit the current to a maximum value while allowing the current to vary by the current limiting components from the maximum to a lower value dependent on conductivity through the ionically conductive concrete or mortar material;
   wherein the anode and the storage component are both at least partly contained in the ionically conductive concrete or mortar material.

2. The method according to claim 1 wherein the current limiting components act to extend the life of a battery or galvanic anode system as these have limited capacity and do not function after the limited capacity is consumed.

3. The method according to claim 1 wherein the current limiting components comprise at least one conductor and a transistor where a current through the transistor is limited to the maximum.

4. The method according to claim 3 wherein the current limiting components consist of said at least one conductor, said transistor and a resistor.

5. The method according to claim 3 wherein the transistor is an FET.

6. The method according to claim 1 wherein the current limiting components are arranged to consume power of 1 μA or less.

7. The method according to claim 1 wherein the current is limited to the maximum value to within 20% depending on the stability of the voltage source.

8. The method according to claim 1 wherein the current limiting components form part of a combined unit which includes the anode and a connector.

9. The method according to claim 1 wherein the current limiting components are associated with and operate only in respect of a single anode.

10. The method according to claim 1 wherein the storage component is connected as a single unit with the anode.

11. The method according to claim 1 wherein the storage component is contained within a closed or sealed canister defining the anode on an exterior surface.

12. The method according to claim 1 wherein replacement electrical energy is introduced by re-charging the storage component.

13. The method according to claim 1 wherein replacement electrical energy is introduced by replacing the storage component.

14. The method according to claim 1 wherein the anode comprises stainless steel.

15. The method according to claim 1 wherein there is provided a second anode of a material which is less noble than the steel reinforcing member metal section so as to generate a galvanic voltage difference between the second anode and the steel reinforcing member metal section and cause a current to flow through the ionically conductive concrete or mortar material between the anode and the steel reinforcing member metal section so as to provide cathodic protection of the steel reinforcing member metal section and wherein the current limiting components use a voltage difference between one anode and the steel reinforcing member metal section and a resistor to generate a reference current for the current limiting components.

16. A method for cathodically protecting and/or passivating a steel reinforcing member in an ionically conductive concrete or mortar material, comprising:
   providing an anode for communication of an electrical current to the steel reinforcing member in the ionically conductive concrete or mortar material;
   generating a voltage difference between the anode and the steel reinforcing member so as to cause a current to flow through the ionically conductive concrete or mortar material between the anode and the steel reinforcing member so as to provide cathodic protection of the steel reinforcing member;
   wherein the anode is an impressed current anode;
   and wherein the voltage difference is generated by a storage component of electrical energy with two poles for communicating electrical current generated by release of the electrical energy and by electrically connecting one pole to the steel reinforcing member and by electrically connecting the other pole to the anode;
   at least partly burying the anode and the storage component in the concrete or mortar material while in an unset condition;

causing the concrete or mortar material to set with the anode and storage component therein;

and restricting formation of gas bubbles in the concrete or mortar material at the steel reinforcing member and at the anode while the concrete or mortar material sets by providing electrical components which limit the current to a maximum value.

17. The method according to claim 16 wherein there is provided a second sacrificial anode for communication of an electrical current to the steel reinforcing member in the ionically conductive concrete or mortar material.

18. The method according to claim 16 wherein the electrical components use a voltage difference between said impressed current anode and the steel reinforcing member and a resistor to generate a reference current for the electrical components.

19. A method for cathodically protecting and/or passivating a steel reinforcing member in an ionically conductive concrete or mortar material, comprising:
providing an anode construction for communication of an electrical current to the steel reinforcing member in the ionically conductive concrete or mortar material;
generating a voltage difference between the anode construction and the steel reinforcing member so as to cause a current to flow through the ionically conductive concrete or mortar material between the anode and the steel reinforcing member so as to provide cathodic protection of the steel reinforcing member;
providing electrical components which limit the current to a maximum value;
the electrical components including at least one electrical conductor connected to the anode construction;
wherein the electrical components including said at least one electrical conductor and the anode construction form components of a common body;
and at least partly burying the common body as a single unit in the concrete or mortar material.

20. The method according to claim 19 wherein the anode construction comprises a sacrificial anode.

21. The method according to claim 19 wherein said anode construction comprises a first sacrificial anode and a second impressed current anode for communication of an electrical current to the steel reinforcing member in the ionically conductive concrete or mortar material;
generating a voltage difference between the first sacrificial anode and the steel reinforcing member so as to cause a first current to flow through the ionically conductive concrete or mortar material between the first sacrificial anode and the steel reinforcing member so as to provide cathodic protection of the steel reinforcing member;

wherein a voltage difference between the second impressed current anode and the steel reinforcing member is generated by a storage component of electrical energy with two poles for communicating a second current generated by release of the electrical energy and by electrically connecting one pole to the steel reinforcing member and by electrically connecting the other pole to the second anode.

22. The method according to claim 21 wherein the electrical components use a voltage difference between said second impressed current anode and the steel reinforcing member and a resistor to generate a reference current for the electrical components.

23. The method according to claim 21 wherein the storage component is contained within a closed or sealed canister defining the anode on an exterior surface.

24. The method according to claim 21 wherein the second impressed current anode comprises stainless steel.

25. The method according to claim 19 wherein the common body is buried in the concrete or mortar material while in an unset condition and the concrete or mortar material is caused to set with the common body therein and wherein said electrical components which limit the current to a maximum value act to restrict formation of gas bubbles in the concrete or mortar material at the steel reinforcing member and at the anode while the concrete or mortar material sets.

26. A method for cathodically protecting and/or passivating a steel reinforcing member metal section in an ionically conductive concrete or mortar material, comprising:
providing an anode for communication of an electrical current to the steel reinforcing member metal section in the ionically conductive concrete or mortar material;
wherein the anode is an impressed current anode;
generating a voltage difference between the anode and the steel reinforcing member metal section so as to cause a current to flow through the ionically conductive concrete or mortar material between the anode and the steel reinforcing member metal section so as to provide cathodic protection of the steel reinforcing member metal section; and
providing electrical components which limit the current to a maximum value;
wherein the storage component is contained within a closed or sealed canister defining the anode on an exterior surface.

27. The method according to claim 1 wherein there is provided a second sacrificial anode for communication of an electrical current to the steel reinforcing member in the ionically conductive concrete or mortar material.

* * * * *